(No Model.)
J. C. CONNELL.
HARNESS.
No. 483,540. Patented Oct. 4, 1892.
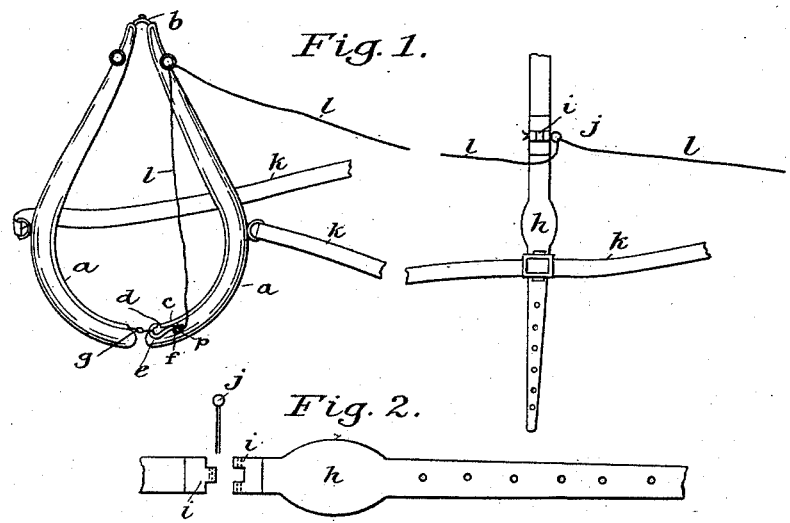
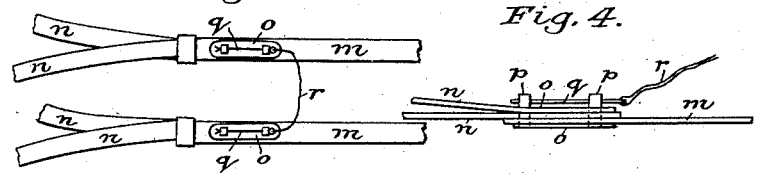
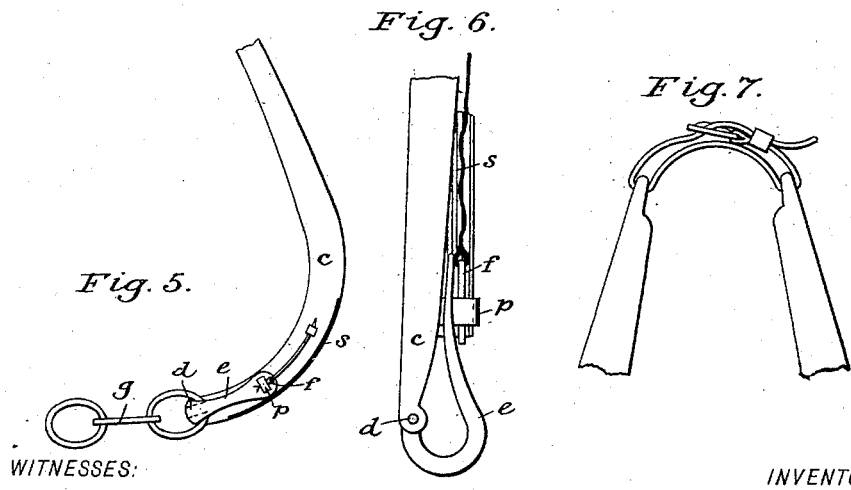
WITNESSES:
E. B. Bolton
M. A. Walsh
INVENTOR
James Coleman Connell
BY
Richardson
ATTORNEYS

UNITED STATES PATENT OFFICE.

JAMES COLEMAN CONNELL, OF SIMLA, INDIA.

HARNESS.

SPECIFICATION forming part of Letters Patent No. 483,540, dated October 4, 1892.

Application filed February 27, 1892. Serial No. 423,102. (No model.) Patented in England May 2, 1891, No. 7,641.

*To all whom it may concern:*

Be it known that I, JAMES COLEMAN CONNELL, a subject of the Queen of Great Britain, residing at Simla, India, have invented Improvements in and in connection with Harness for Use on all Descriptions of Road Vehicles, (for which I applied for provisional protection in Great Britain on the 2d day of May, 1891, and numbered 7,641,) of which the following is a specification.

The object of this invention is to provide a safety-harness for horses and other draft-animals which can be instantly removed when requisite, as in cases of accident or from other causes, by this means releasing the animal or animals from the vehicle at a moment's notice. With this object I construct the harness in any of the usual forms, and of leather or other suitable materials, but in various positions, where required. I insert my safety-junctions, by means of which the harness is made instantly detachable, such junctions being placed under the control of either the driver or an occupant of the vehicle, as desired, by means of light cords or other suitable connections. The method or means by which this object is attained may be the better understood by reference to the accompanying sheet of illustrative drawings, in which—

Figure 1 represents the principal parts of the harness. Fig. 2 is a view of the manner of connecting parts of the belly-band. Fig. 3 is a detail plan view of manner of connecting the coupling-reins with the driving-reins. Fig. 4 is a side view of the same. Fig. 5 is an enlarged view of means for connecting the hames. Fig. 6 is a side elevation of the same, and Fig. 7 is a detail view of means for connecting the top of the hames.

The hames $a\ a$ are of the form shown, being divided at both top and bottom. At the top $b$ they are joined by means of a strap and buckle, as shown more clearly in the detail drawing of same, Fig. 7, which is an enlarged view of the upper ends of the hames only. At the lower division of the hames the safety-junction is formed in the following manner: On the end $c$ a hinged joint $d$ carries a pivoted chain or strap-hook $e$, which is slotted to receive an eye $p$, through which a split pin or other suitable device $f$ is inserted to secure the whole in position. On the removal of the split pin or other device $f$, from the staple or eye $p$ the least strain upon the junction causes the hook to fly back, thus releasing the chain or strap $g$ and unfastening the hames from the animals.

In any convenient position in the belly-band $h$, Fig. 1, is inserted a hinged joint, as shown at $i$, through the knuckle of which a pin $j$, preferably a split pin for safety, is passed. The best form of hinged joint for this purpose is shown more clearly in the detail view, Fig. 2.

The traces $k\ k$ are of the usual construction, and therefore need no special description here.

When the harness is adjusted in position on the animal or animals, the cord or cords $l\ l$ are affixed to the split pins or other fastening devices $f\ j$, and the free end or ends of same are placed in such a position as to be within easy reach of either the driver or an occupant of the vehicle, as desired.

In any suitable position or positions on the driving-rein, but preferably within easy reach of the driver, metal plates are affixed, having one or more, but preferably two, projections or staples. On the coupling-reins like metal plates are also affixed, in which holes or slots are formed corresponding with the projecting staples on the plates affixed to the driving-rein. When these are all joined as required, they are secured with a split pin, as in the before-mentioned junctions, such pin being of sufficient length to pass through both the staples with its head toward the driver. The heads of the pins on the left and right hand reins should preferably be connected by a suitable strap or cord, so that both pins can be removed at the same time by one operation.

$m\ m$ represent the driving-reins, and $n\ n$ $n\ n$ the coupling-reins, joined, as shown, by the plates $o$ and $o'$. The plate $o$, Fig. 4, is affixed to the driving-rein $m$ and has the two staples $p\ p$ riveted firmly thereon. The plates $o'$, affixed to the coupling-reins $n\ n$, are slotted to receive the staples $p\ p$, as shown, the whole held together by the split pins $q\ q$, the heads of which are connected by the strap or cord $r$.

This invention is applicable to all descriptions of harness, both double and single; but where used for double harness the junctions should all be made, preferably, on the outer sides of same, to prevent the possibility of the pins being accidentally pulled from their several positions by the rubbing or jolting together of the animals. To prevent this possibility, however, shields may be affixed at the sides of the junctions on the hames, as represented by the letter $s$ in Figs. 5 and 6.

As will be seen by the above description, my harness can be instantly removed from the animal or animals when required by either the driver or other person having command of the cord or cords $l$ and $r$, to which the releasing-pins $j$, $f$, and $q$, respectively, are attached, thus preventing the serious accidents often caused by runaway or otherwise unmanagable animals.

My detachable harness will be found very convenient for harnessing restive animals, as it can be affixed without passing in front of the animal's head. The hames will be found specially applicable for military purposes.

What I desire to claim by Letters Patent is—

1. In harness, the combination, with the hames, the hook $e$ pivoted thereon, staples $p$, adapted to be engaged by said hook, the pin $f$, adapted to pass through said staple to hold said hook firmly in place, and a cord attached to one end of said pin to disengage the same from the staple, and a detachable band and reins, substantially as set forth.

2. In harness, the combination, with the driving and coupling reins, of plate $o$, provided with staples adapted to pass through said driving and coupling reins to hold the same together, pins $q$, passing through said staples, a cord attached to the ends of said pins to disengage the same from the staples, and a detachable hame and band, substantially as set forth.

3. In harness, the combination, with the band $h$, provided with hinge $i$, pin $j$, adapted to connect said hinge and having cord attached to one end to disengage the same to separate the parts of the band, and a detachable hame and reins, substantially as set forth.

Dated this 20th day of October, 1891.

JAMES COLEMAN CONNELL.

Witnesses:
  A. R. DUNNE,
  J. L. PILKINGTON.